(12) United States Patent
Charlton et al.

(10) Patent No.: US 10,749,602 B2
(45) Date of Patent: Aug. 18, 2020

(54) ADAPTIVE OPTICAL MODEM CONFIGURATION BASED ON OPERATING CONDITIONS

(71) Applicant: Ciena Corporation, Hanover, MD (US)

(72) Inventors: Douglas W. Charlton, Ottawa (CA); Andrew D. Shiner, Ottawa (CA); Eric Maniloff, Stittsville (CA); Michael Y. Frankel, Bethesda, MD (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/431,029

(22) Filed: Jun. 4, 2019

(65) Prior Publication Data

US 2019/0326992 A1 Oct. 24, 2019

Related U.S. Application Data

(63) Continuation of application No. 15/960,879, filed on Apr. 24, 2018, now Pat. No. 10,348,410.

(51) Int. Cl.
*H04B 10/40* (2013.01)
*H04B 10/079* (2013.01)
*H04B 10/2569* (2013.01)

(52) U.S. Cl.
CPC ......... *H04B 10/40* (2013.01); *H04B 10/0795* (2013.01); *H04B 10/2569* (2013.01)

(58) Field of Classification Search
CPC ............................ H04B 10/40; H04B 10/0795
See application file for complete search history.

(56) References Cited

U.S. PATENT DOCUMENTS

| 6,430,336 | B1 | 8/2002 | Frankel |
| 6,765,659 | B1 | 7/2004 | Bhatnagar et al. |
| 6,842,561 | B2 | 1/2005 | Mak et al. |
| 6,907,201 | B1 | 6/2005 | Frankel |

(Continued)

FOREIGN PATENT DOCUMENTS

| EP | 2882115 A1 * | 6/2015 | ....... H04B 10/07955 |
| EP | 3236228 A1 | 10/2017 | |

OTHER PUBLICATIONS

Douglas Charlton et al., Field measurements of SOP transients in OPGW, with time and location correlation to lightning strikes, vol. 25, No. 9 | May 1, 2017 | Optics Express 9689, Optical Society of America, pp. 1-8.

*Primary Examiner* — Mina H Shalaby
(74) *Attorney, Agent, or Firm* — Clements Bernard Walker; Christopher L. Bernard; Lawrence A. Baratta, Jr.

(57) ABSTRACT

Systems and methods include a transmitter configured to communicate over an optical link to a receiver; and a controller configured to, with the transmitter and the receiver operating in a first operating mode, obtain measurements related to operation over the optical link, determine statistical properties of the optical link based on the measurements, wherein the statistical properties relate to conditions on the optical link, and set a second operating mode of one or more of the transmitter and the receiver based on the determined statistical properties. Each of the first operating mode and the second operating mode refer to associated settings in one or more of the transmitter and the receiver, and there is a trade-off between the first operating mode and the second operating mode and associated margin on the optical link.

20 Claims, 9 Drawing Sheets

(56) References Cited

U.S. PATENT DOCUMENTS

| | | | |
|---|---|---|---|
| 7,346,279 B1* | 3/2008 | Li | H04B 10/40 398/155 |
| 7,574,134 B2 | 8/2009 | Frankel | |
| 7,606,575 B2* | 10/2009 | Mahany | G06F 1/163 455/452.2 |
| 8,045,855 B2 | 10/2011 | Frankel | |
| 8,433,205 B2* | 4/2013 | Koike-Akino | H04B 10/5055 398/148 |
| 9,143,238 B2 | 9/2015 | Roberts et al. | |
| 9,749,058 B2 | 8/2017 | Reimer et al. | |
| 9,774,392 B2 | 9/2017 | Doucet et al. | |
| 9,806,801 B2 | 10/2017 | Maniloff | |
| 10,015,184 B1* | 7/2018 | Bell | H04L 63/1425 |
| 2001/0055311 A1* | 12/2001 | Trachewsky | H04L 1/0003 370/445 |
| 2001/0055319 A1* | 12/2001 | Quigley | H04J 3/1694 370/480 |
| 2003/0142390 A1 | 7/2003 | Parry et al. | |
| 2003/0198288 A1* | 10/2003 | Abdelilah | H04L 1/0002 375/222 |
| 2004/0028159 A1* | 2/2004 | Abdelilah | H04L 7/0062 375/350 |
| 2005/0017848 A1* | 1/2005 | Flen | H04B 3/542 340/870.02 |
| 2005/0123028 A1* | 6/2005 | Cioffi | H04B 3/32 375/222 |
| 2006/0088056 A1* | 4/2006 | Quigley | H04L 1/0003 370/468 |
| 2006/0127086 A1 | 6/2006 | Frankel | |
| 2008/0101448 A1* | 5/2008 | Meleis | H04M 3/306 375/225 |
| 2009/0323903 A1* | 12/2009 | Cioffi | H04B 1/1027 379/32.01 |
| 2010/0142943 A1* | 6/2010 | Frankel | H04B 10/0795 398/25 |
| 2011/0200048 A1* | 8/2011 | Thi | H04B 3/23 370/392 |
| 2013/0209091 A1* | 8/2013 | Mateosky | H04B 10/07953 398/26 |
| 2013/0235957 A1* | 9/2013 | El Khamy | H04L 1/0051 375/341 |
| 2014/0050476 A1* | 2/2014 | Grigoryan | H04B 10/2572 398/65 |
| 2014/0133865 A1* | 5/2014 | Reimer | H04B 10/532 398/152 |
| 2016/0050470 A1* | 2/2016 | Swinkels | H04Q 11/0062 398/45 |
| 2018/0103302 A1* | 4/2018 | Bell | G01R 35/005 |
| 2018/0174680 A1* | 6/2018 | Sampath | G06F 19/3418 |
| 2018/0359029 A1* | 12/2018 | Shiner | H04B 10/0795 |

* cited by examiner

ADAPTIVE OPTICAL MODEM CONFIGURATION BASED ON OPERATING CONDITIONS

CROSS-REFERENCE TO RELATED APPLICATION(S)

The present disclosure is a continuation of U.S. patent application Ser. No. 15/960,879, filed Apr. 24, 2018, and entitled "Adaptive optical modem configuration based on operating conditions," the contents of which are incorporated by reference herein.

FIELD OF THE DISCLOSURE

The present disclosure generally relates to optical networking systems and methods. More particularly, the present disclosure relates to adaptive optical modem configuration based on operating conditions.

BACKGROUND OF THE DISCLOSURE

Optical networks are using polarization multiplexed coherent modulation schemes to accommodate the ever-increasing bandwidth demands. An optical link is formed between two nodes or network elements via optical modems (also referred to as optical transceivers, transponders, transmitters/receivers, etc.).

Modems are typically configured to provide sufficient operating margin in order to guarantee a given signal quality over a specified interval such as the anticipated lifespan of the device. In many cases these performance guarantees are expressed in terms of a maximum allowable Bit Error Rate (BER) at the output of a receiver's Forward Error Correction (FEC) circuit or post FEC BER. There is a strong relation between the signal to noise ratio and the maximum rate of data transmission for a given bit error rate. The available Signal-to-Noise (SNR) margin is the difference between the SNR which the modem is operating at and the SNR below which an unacceptable number of bit errors are expected. The SNR decreases as noise increases where noise comes from a variety of sources internal to the transceiver such as the quiescent noise from feedback loops and external to the transceiver such as ASE from optical amplifiers in the link. There are also transitory noise sources such as noise arising from polarization, laser and clock transients. For a given reach and data rate the transceiver must be configured to insure that there is sufficient margin to satisfy the performance guarantees for the combinations of noise sources which are anticipated over the lifetime of the guarantee.

An aspect of optical modems is they can be configured in various different operating modes to address various aspects of the operation, such as State of Polarization (SOP) tracking, bias control, laser transients, and the like. As described herein, the operating modes generally refer to some settings in the optical modem for the operation of feedback loops, control loops, etc. to maintain signal quality. There is also a trade-off between operating modes and margin (dBQ) which leads to the question of what is the optimal setting for the operating modes at any given time based on current operating conditions.

For example, polarization multiplexed modulation schemes require an optical receiver that is able to recover the SOP of a signal and to track any changes which occur during the lifetime of the channel. The rate of change of SOP of the signal into the optical receiver can vary by orders of magnitude depending on the link through which the channel is propagated. The conventional methodology is to provision the SOP tracking circuit at the Start of Life (SOL) based on the maximum expected rates of change of SOP over the life of the transceiver. Increasing the maximum polarization tracking rate of the receiver often comes at the expense of higher quiescent noise from the tracking circuit, which directly reduces the available SNR margin. This set and forget approach with a static provisioning of an optical modem is suboptimal for cases where transient events are not uniformly distributed. For example, cases have been observed where polarization transients caused by lighting have a mean arrival time that is orders of magnitude larger than the median. In this case transients arrive in bunches, and static provisioning operates the tracking circuit with excess bandwidth (noise) during the time between bunches when transients are unlikely to occur. For example, SOP transient arrival statistics are described in Douglas Charlton et al., "Field measurements of SOP transients in OPGW, with time and location correlation to lightning strikes," Opt. Express 25, 9689-9696 (2017). Also, conventional optical modems can include hardware to detect and localize SOP transients (e.g., integrated polarimeters or the like). An example is described in commonly-assigned U.S. Pat. No. 9,774,392, issued Sep. 26, 2017, and entitled "SYSTEMS AND METHODS USING A POLARIMETER TO LOCALIZE STATE OF POLARIZATION TRANSITS ON OPTICAL FIBERS," the contents of which are incorporated by reference herein.

BRIEF SUMMARY OF THE DISCLOSURE

For cases where there is at least some knowledge of the underlying statistical properties of a disturbance that affects the operation of a coherent modem, such as an SOP or other transient, it is desirable to update the operating modes of the coherent modem in consideration of those statistical properties. Examples includes cases such as the probability of observing a transient given that a transient was recently observed or the probability of observing a transient given current weather conditions. If the probability of observing a transient is not constant over the lifetime of the modem it is not appropriate to us a static provisioning.

The optimum provisioning can also consider the current operating state of the modem. For example, if there is significant excess margin such that the probability of encountering a failure caused by all other noise sources is low it may be optimal to operate in a fast tracking mode even in cases where the likelihood of encountering a transient is also low.

In an embodiment, a method of operating an optical modem includes operating with first operating settings; and, responsive to detection or expectation of a disturbance in an operating condition associated with the optical modem, operating with second operating settings for a time period based on statistical properties of the disturbance. The method can further include reverting to the first operating settings after the time period. The time period can be a holdoff time to remain operating with the second operating settings, wherein the holdoff time can be set based on the statistical properties, and the method can further include resetting the holdoff time for each additional disturbance detected after the disturbance and before an expiry of the holdoff time. The statistical properties of the disturbance can include one or more of arrival time, periodicity, magnitude, rate of change, temporal, and correlation, and wherein the statistical properties can be determined through measurements over time.

The method can include, responsive to a conditional probability of the disturbance, operating with the second operating settings for the time period, wherein the conditional probability is determined from an external data source. The disturbance can be a polarization transient. The statistical properties can include arrival time statistics for polarization transients which are used to determine the time period. The disturbance can be a transient affecting a laser comprising one or more of an optical frequency transient and an intensity transient. The disturbance can be a transient affecting a clock in a network element with the optical modem. The second operating settings can cause a reduced margin relative to the first operating settings for the time period. The statistical properties can be determined by a server which performs steps of obtaining field measurements and utilizing machine learning to determine the statistical properties based on the obtained field measurements or other data sources.

In another embodiment, an optical modem includes a transmitter and a receiver each configured to communicate over an optical link; and a controller configured to cause operation with first operating settings; and, responsive to detection or expectation of a disturbance in an operating condition associated with the optical modem, cause operation with second operating settings for a time period based on statistical properties of the disturbance. The controller can be further configured to cause reversion to the first operating settings after the time period. The time period can be a holdoff time to remain operating with the second operating settings, wherein the holdoff time is set based on the statistical properties, wherein the controller can be further configured to reset the holdoff time for each additional disturbance detected after the disturbance and before an expiry of the holdoff time.

The statistical properties of the disturbance can include one or more of arrival time, periodicity, magnitude, rate of change, temporal, and correlation, and wherein the statistical properties can be determined through measurements over time. The controller can be further configured to, responsive to a conditional probability of the disturbance, cause operation with the second operating settings for the time period, wherein the conditional probability is determined from an external data source. The disturbance can be a polarization transient. The statistical properties can include arrival time statistics for polarization transients which are used to determine the time period. The second operating settings can cause a reduced margin relative to the first operating settings for the time period.

In a further embodiment, an optical modem includes a transmitter and a receiver each configured to communicate over an optical link; and a controller configured to obtain measurements related to operation over the optical link, determine statistical properties of the optical link based on the measurements, and set operating settings of the transmitter and/or receiver based on the determined statistical properties. The controller can be further configured to change the operating settings based on detection or expectation of a transient from the measurements and based on the statistical properties of the transient.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Figure 1:
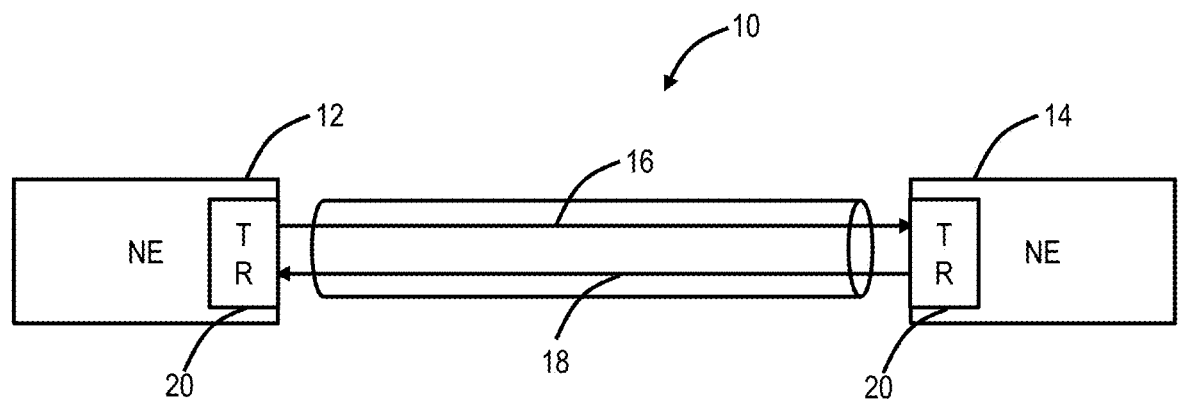
FIG. 1 is a network diagram of an optical network with two network elements interconnected by fibers and having an optical modem for communication therebetween.

In various embodiments, the present disclosure relates to adaptive optical modem configuration based on operating conditions. The present disclosure includes dynamically provisioning a network element in an optical network in response to a disturbance of an operating condition of that network element based on a consideration of the statistical properties of the disturbance. The statistical properties can include the arrival time, periodicity, magnitude, rate of change, temporal or other correlation, other properties of the disturbance, and/or other observables which are material to the disturbance. The statistical properties are probabilities which are conditioned on one or more observables that can be intrinsic or extrinsic to the network element. The statistical properties can be determined using a machine learning algorithm and/or the statistical properties are updated in response to observations of the network element, the network, or the external environment. Also, a priori knowledge of the distribution may also be used as an initial estimate of the true distribution. The observable can include available margin, the occurrence of disturbances on the network element or one or more other network elements, time of year, weather, manufacturing data, history of other network elements of the same type or different type, network topology, and/or the network composition and state include the presence and characteristics of interfering channels. The objective is to overcome the so-called set and forget configuration approach and allow for selection of a more optimal operating mode given the current operating conditions in consideration of the statistical properties of the disturbance.

In an embodiment, the disturbance can be a polarization transient, and the statistical properties are the arrival time statistics for polarization transients. In another embodiment, the disturbance can be a transient affecting a network element's laser source such as an optical frequency or intensity transient. In yet another embodiment, the disturbance can affect the clock in a network element. In a conventional approach the control loops for each type of disturbance would be provisioned to give an acceptable compromise between the quiescent noise engendered by the control loops designed to address each type of disturbance and the probability of observing a disturbance that is large enough to cause a failure over the lifetime of the link. With dynamic provisioning, the margin allocated to the tracking circuit for each type of disturbance is reduced on average and is only increased at times when transients of that type are more probable. With partial knowledge of the statistical characteristics of different transient events the modem can operate closer to an optimal tradeoff between quiescent noise and tracking capability where the proximity to that optimum reduces as knowledge of the underlying statistical properties of each type of disturbance improves.

As described above, the conventional approach for feedback circuits in an optical modem is initial provisioning (e.g., manual) at the start of life and in most cases, this provisioning does not change in response to changes in the operating environment. Additionally, it has been determined, with respect to the operating environment, that lighting induced polarization transient events are not uniformly distributed. Thus, knowledge of the arrival time statistics can be used to dynamically provision the polarization tracking loop bandwidth to have a high probability of encountering a transient while in a mode with high tracking bandwidth while spending the majority of the time in a mode with lower bandwidth and lower quiescent noise. Specifically, this approach avoids paying a noise penalty for increased SOP tracking at all times and instead only pays it when the need for increased tracking is anticipated. This may be done via the detection of trackable polarization transients and using them to change receiver tracking to a faster mode. Additionally, the loops can dynamically apply a portion of the available margin to improve the rate of polarization tracking in normal operation, reducing the likelihood of a traffic impact from an isolated or initial polarization event. By dynamically modifying the tracking rate, polarization tracking can be optimally modified with evolving link margin.

While this approach is described with reference to SOP tracking, those skilled in the art will recognize this approach is applicable to any control loop which is designed to mitigate the effect of a disturbance where there is some knowledge of the statistical properties of the disturbance such that these statistical properties can be used to adjust the modem, e.g., operating margin, tracking rate, etc. in response thereto. The average noise margin allocated for a given type of transient can be reduced with some knowledge of the statistical properties of that transient.

Optical Line System

FIG. 1 is a network diagram of an optical network 10 with two network elements 12, 14 interconnected by fibers 16, 18 and having an optical modem 20 for communication therebetween. Of course, other configurations are possible with the optical network 10 including intermediate network elements, amplifiers, etc. The network elements 12, 14 connected to one another over the fibers 16, 18 can be referred to as an optical line system and represents a single span (or multiple spans if there were intermediate network elements). Of course, those of ordinary skill in the art will recognize the optical network 10 can include additional nodes, fibers, bundles, spans, optical amplifier sites, add/drop sites, etc. The network elements 12, 14 can be any type of optical network element including, without limitation, Wavelength Division Multiplexing (WDM) terminals, Reconfigurable Optical Add/Drop Multiplexers (ROADMs), switches, routers, cross-connects, etc. The optical modems 20 can also be referred to as optical transceivers, transponders, etc. and are configured to provide transmission of traffic-bearing channels. The optical network 10 and the network elements 12, 14 can further include optical amplifiers such as Erbium Doped Fiber Amplifiers (EDFAs), Raman Amplifiers, or the like as well as include multiplexer and demultiplexer components such as splitters, combiners, Wavelength Selective Switches (WSSs), etc. to perform WDM of multiple traffic-bearing channels from multiple modems 20. Also, the network elements 12, 14 can include various other components such as Optical Service Channels (OSCs) for management communication between optical nodes such as optical amplifiers, Optical Time Domain Reflectometers (OTDR) to measure back reflections over the fibers 16, 18, Raman amplifiers, and the like.

The various aforementioned components in the network elements 12, 14 can be physically realized in hardware components in a network element forming the network elements 12, 14. The hardware components can be included in line cards, line modules, pluggable modules, "pizza boxes" which are small-form-factor units such as 1-2 Rack Units (RU) high, or the like. The hardware components are generally optically connected to one another for ultimate transmission and reception over the fibers 16, 18. As described herein, an optical line device is a hardware device which is part of the network elements 12, 14 or intermediate network elements and integrated therein. Examples of optical line devices can include Raman amplifier modules, EDFA amplifier modules, OSC modules, OTDR modules, modems 20, and the like.

The modems 20 can include Non-Return-to-Zero (NRZ), duobinary, quadrature amplitude modulation (QAM), differential phase shift keying (DPSK), differential quadrature phase shift keying (DQPSK), orthogonal frequency-division multiplexing (OFDM), polarization multiplexing with any of the foregoing, and any other type of optical modulation and detection technique. Importantly, as the modems 20 utilize advanced polarization multiplexed coherent modulation/demodulation techniques, they are susceptible to SOP transients and other disturbances. In dual polarization (DP) modulation systems, optical receivers in the modems 20 must track the SOP of the optical signal. In some instances, very fast SOP transients have been known to occur, which can impair receiver performance or in the worst-case cause bit errors.

The network elements 12, 14 can communicate to a management system such as a Network Management System (NMS), an Element Management System (EMS), a Path Computation Element (PCE), a Software Defined Networking (SDN) controller, a control plane, or the like. SOP transient statistics can be provided to the management system and used for 1) troubleshooting to identify and localize the cause of errors, 2) making decisions about what types of modems to deploy or in the case on programmable modems, which type of configuration (modulation scheme, spectrum amount, etc.), 3) optimize the performance of modems based on the required SOP tracking speed of the fibers 16, 18, 4) making decisions when rerouting traffic during network restoration (e.g., avoiding problematic spans at the time of rerouting), and the like. Additionally, the present disclosure contemplates using the SOP transient statistics to make decisions about operating modes of the optical modems 20, e.g., in the midst of expecting SOP transients, increase SOP tracking even if it reduces the margin.

Integrated Polarimeter in an Optical Line Device/System

Figure 2:
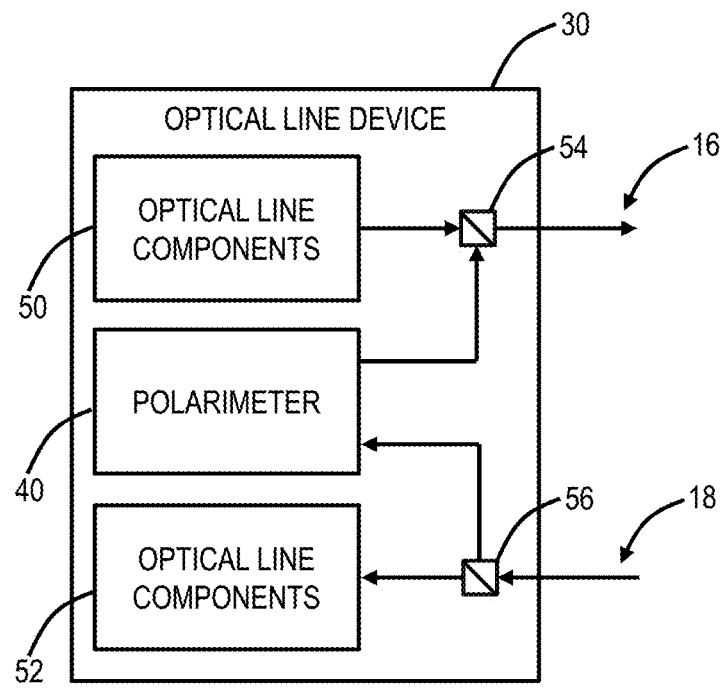
FIG. 2 is a block diagram of an optical line device with a polarimeter integrated therein.

FIG. 2 is a block diagram of an optical line device 30 with a polarimeter 40 integrated therein. Of note, the configuration in FIG. 2 is described in commonly-assigned U.S. patent application Ser. No. 15/177,982, filed Jun. 9, 2016, and entitled "INTEGRATED POLARIMETER IN AN OPTICAL LINE SYSTEM," the contents of which are incorporated by reference herein. In FIG. 2, the optical line device 30 includes the polarimeter 40 integrated therein, supporting the transmission of a polarimeter probe signal on the fiber 16 and reception of a corresponding polarimeter probe signal on the fiber 18. In an embodiment, the optical line device 30 can be used at various nodes in the optical network 10 to support polarimeter probe signals on both the fibers 16, 18. Variously, the transmitter for the single polarimeter probe signal can be tunable. Where the single polarimeter probe signals from opposing optical line devices 30 counter-propagate, the tunable transmitter can tune to different wavelengths for each of the polarization probe signals.

The optical line device 30 includes various optical line components 50, 52 in addition to the polarimeter 40. The optical line components 50 are shown transmitting on the fiber 16 whereas the optical line component 52 are shown receiving from the fiber 18. The optical line components 50, 52 can be anything integrated within the optical line system such as EDFA amplifiers, Raman amplifiers, OSCs, OTDRs, modems 20 or transceivers, WSSs, or the like. The optical line device 30 includes filters 54, 56 for multiplexing and demultiplexing the polarimeter probe signal with WDM signals, OSC signals, OTDR signals, Raman pumps, and the like. In the optical line device 50, the filter 54 configured to combine an output of a transmitter for the polarimeter 40 with an output of the optical line components 50 and the filter 56 is configured to split the polarimeter probe signal to the polarimeter 40 and the other signals (WDM signals, OSC signals, OTDR signals, Raman pumps, etc.) to the optical line components 52.

With respect to integration, the optical line device 30 can be line cards, Raman amplifier modules, EDFA amplifier modules, OSC modules, OTDR modules, modems 20, pluggable modules, pizza boxes, and the like. Also, the integrated polarimeter can be realized in a pluggable module that is configured to plug into another hardware device in the optical line system. These hardware devices are part of the optical line system and operate in an integrated manner. That is, these hardware devices support unified management and control, i.e., Operations, Administration, Maintenance, and Provisioning (OAM&P). The polarimeter 40 is able to operate through this unified management and control as well as in-service with WDM traffic-bearing channels, OSC channels, OTDR signals, and the like.

The polarimeter 40 includes a transmitter coupled to the filter 54 and a receiver coupled to the filter 56. Note, generally the polarimeter 40 is a receiving device configured to measure the polarization of a test signal. Those of ordinary skill in the art will recognize the integrated polarimeter described herein includes the receiving device and the transmitter for the test signal, i.e., the polarization probe signal. In an embodiment, the transmitter can be a Distributed Feedback Laser (DFB), such as to provide a single polarization, Continuous Wave (CW) or pulse. The transmitter provides the polarization probe signal at a wavelength which does not interfere with the WDM traffic-bearing channels, OSC channels, OTDR signals, and the like. For example, the WDM traffic-bearing channels may be in the C-band, such as about 1528-1560 nm; of course, other transmission bands are also contemplated. Raman pumps are typically below 1500 nm in the 1400 nm range. The OSC channels, the OTDR wavelengths, and the like can be selected not to interfere with one another and the polarization probe signal. For example, the OSC channels can be 1510 nm, 1625 nm, or the like. In an embodiment, the polarization probe signal is at 1591 nm to avoid nonlinear interaction with Raman pumps. Of course, other values are also contemplated for the polarimeter 40 and the polarimeter probe signal, so long as the value does not interfere with other signals in the optical line system. In an embodiment, the polarimeter 40 can share a laser with an OTDR.

Optical Modems

Figure 3A:
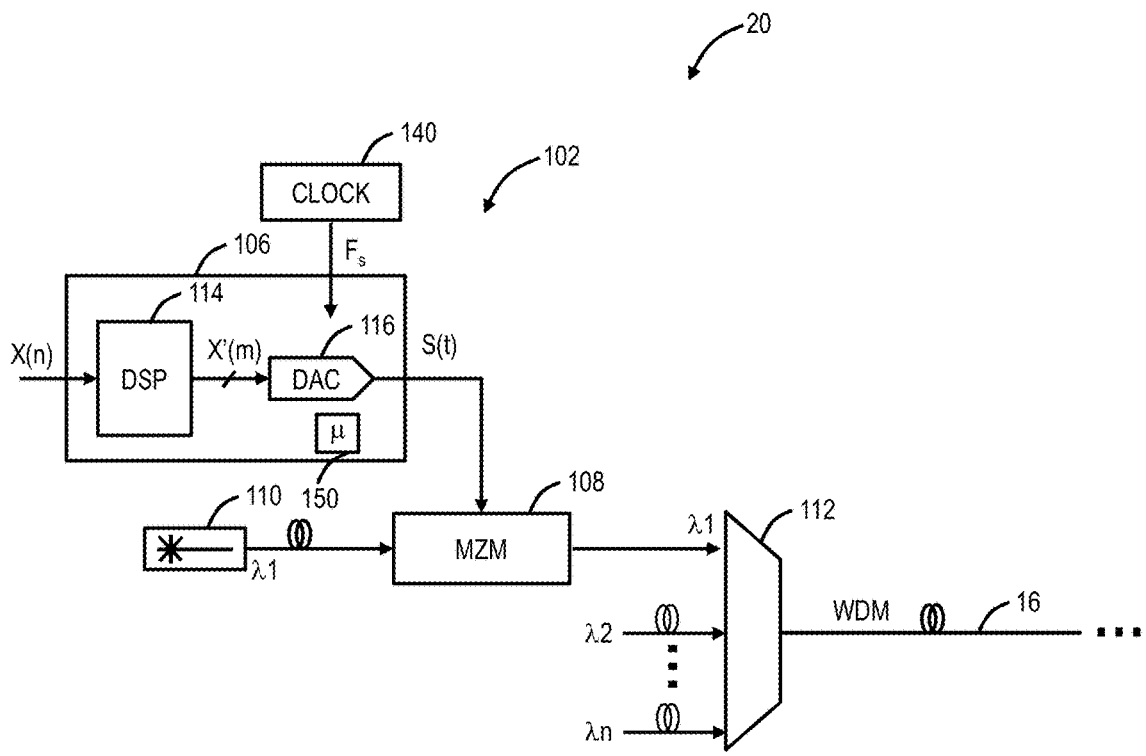
FIG. 3A is a block diagram of an example implementation of an optical modem which generally includes a transmitter and a receiver communicatively coupled to one another via a fiber.
Figure 3A:
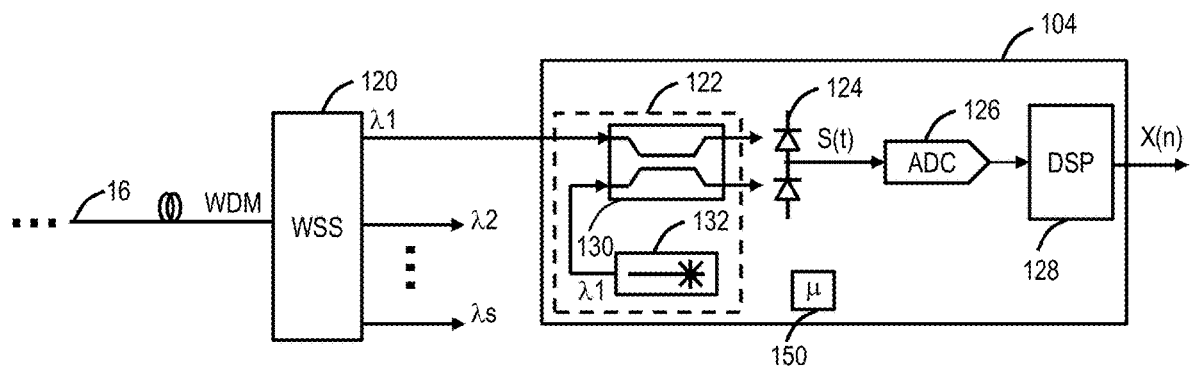

FIG. 3A is a block diagram of an exemplary implementation of an optical modem 20 which generally includes a transmitter 102 and a receiver 104 communicatively coupled to one another via the fiber 16. The transmitter 102 typically includes a signal generator 106 for converting a digital signal X(n) to be transmitted into a drive signal S(t) which drives a modulator 108 (e.g., a Mach-Zehnder Modulator (MZM)). The modulator 108 modulates a narrow-band optical carrier, generated by a laser 110 tuned to a predetermined center wavelength $\lambda_1$ (among other center wavelengths $\lambda_2$ to $\lambda_n$), to generate a corresponding optical channel signal, i.e., a data-bearing signal. The resultant signal may then be multiplexed by a multiplexer 112 into a Wavelength Division Multiplexed (WDM) signal for transmission over the optical fiber link 16 to the receiver 104. Typically, the drive signal S(t) is a radio frequency (RF) analog electrical signal. In such cases, the signal generator 106 may include a Digital Signal Processor (DSP) 114 cascaded with a Digital-to-Analog Converter (DAC) 116. The DSP 114 operates to process the digital signal X(n) to generate a corresponding digital drive signal X'(m), which is designed in accordance with the performance and operating requirements of the DAC 116. The DAC 116 operates in a conventional manner to convert the digital drive signal X'(m) into the required analog RF drive signal S(t) for modulation onto the optical carrier.

The optical channel signal can be demultiplexed and routed through the optical network 10 using filter-based demultiplexer devices or WSSs. For illustration purposes, the receiver 104 is shown as coupled to a drop port of a WSS 120, which operates to communicatively couple the channel signal from an inbound WDM signal to the receiver 104.

The receiver 104 includes an optical front end 122 for supplying the optical channel signal to a photodetector block 124, which operates to detect the incoming optical channel signal and generate an electrical photodetector current containing spectral components corresponding to the high-speed signal S(t). The photodetector current is then sampled by an Analog-to-Digital Converter (ADC) 126 and processed by a corresponding DSP 128 in the receiver 104 using various digital signal processing techniques to recover the original digital signal X(n). In the design of FIG. 3A, the optical front end 122 can be provided by a mixer 130, which combines the incoming optical channel signal with a narrow-band light generated by a local laser 132 tuned to the center wavelength $\lambda_1$ of the optical channel signal. This arrangement may be used to enable coherent detection of the optical channel signal.

Figure 3B:
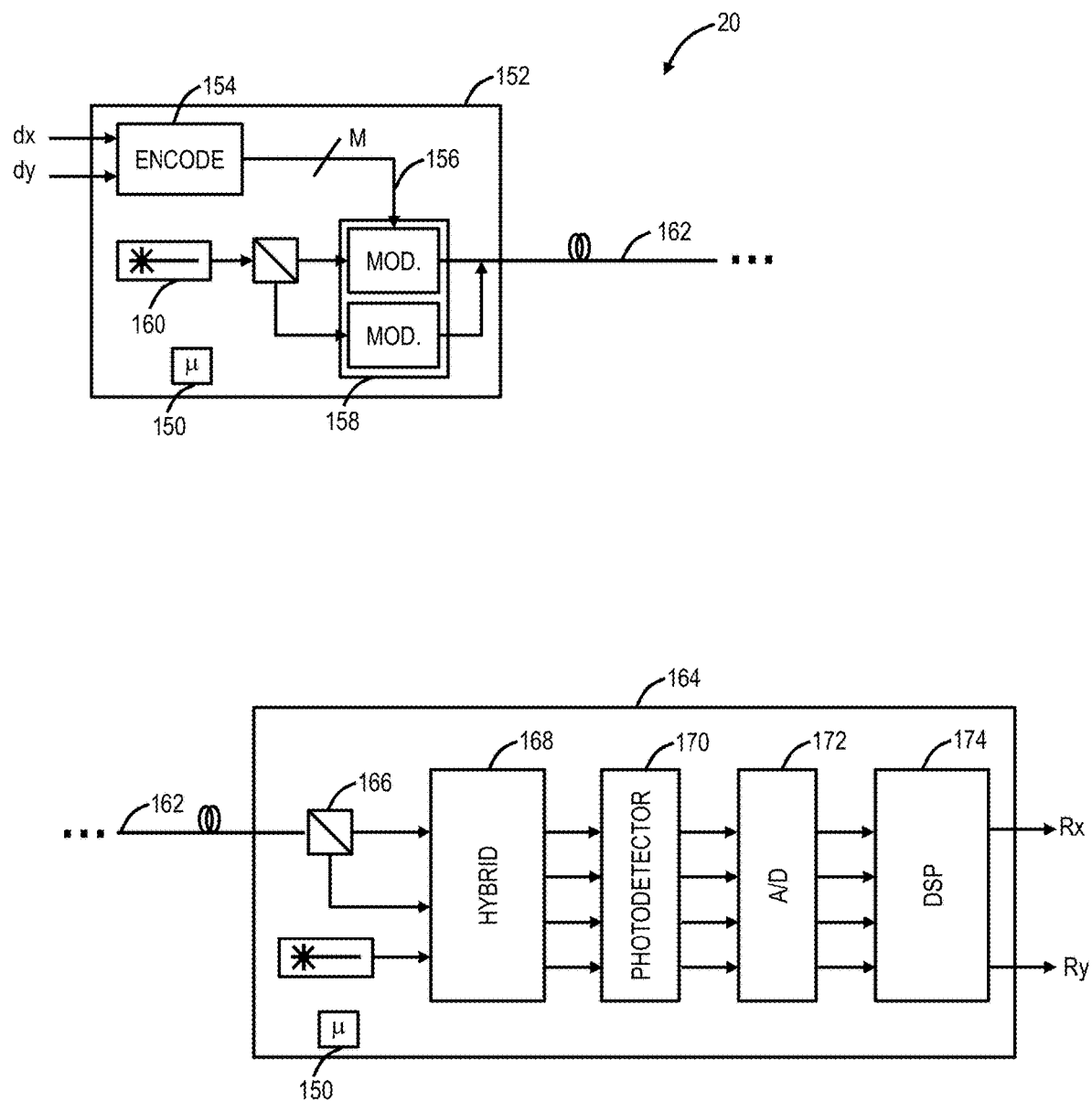
FIG. 3B is a block diagram of another example implementation of an optical modem with dual polarization operation.

FIG. 3B is a block diagram of another example implementation of an optical modem 20 with dual polarization operation. The optical modem 20 in FIG. 3B includes a transmitter 152 with an encoded 154 for encoding a pair of data signals (dx and dy) using an M-dimensional constellation to generate a set of M drive signals 156. The drive signals 156 are then supplied to a modulator 158 for modulating respective dimensions of a Continuous Wave (CW) optical carrier in accordance with the drive signals 156. In the example of FIG. 3A, a pair of data signals (dx and dy) may be encoded as M=4 drive signals 156, which are then used to modulate two dimensions (e.g., phase and amplitude, or I and Q) of each orthogonal polarization of the optical carrier. The CW carrier is typically generated by a laser 160, and the modulator 158 may be implemented using any of a variety of modulator devices, such as phase modulators, variable optical attenuators, Mach-Zehnder interferometers etc. The modulated optical signal appearing at the output of the modulator is transmitted through an optical fiber link 162 to a coherent receiver 164.

The receiver 164 is configured to receive and detect the transmitted data signals, which includes a polarization beam splitter 166 for splitting the received optical signal into received X and Y polarizations, an optical hybrid 168 for separately mixing the X and Y polarizations with a local oscillator, and a set of photodetectors 170 for detecting the optical power of each of the mixing products generated by the optical hybrid 168. An Analog to Digital (A/D) converter block 172 samples each photodetector current, and the resulting sample streams—each of which represents one of the modulated dimensions of the optical carrier field—are processed by a Digital Signal Processor (DSP) 174 in accordance with the M-dimensional constellation to generate recovered signals Rx and Ry that correspond with the transmitted data signals dx and dy.

Coherent detection has the potential to provide access to a rich set of information on the optical field. Despite this, current practices in performance budgeting and system acceptance focus only on the start-of-life (SOL) pre-forward-error-correction (pre-FEC) bit error ratio, translated to $dBQ_2$, or alternatively SOL optical signal-to-noise ratio (OSNR) and ignore the set of measures offered by coherent technology. This is largely because conventional techniques for optical modem characterization, end-of-life (EOL) performance prediction, and performance margin measurement rely heavily on optical noise loading, which is a timely and expensive process, requiring specialized skills and equipment, and is impractical at best.

The modem 20 may be configured to use any of duobinary, QAM, DPSK, DQPSK, OFDM, polarization multiplexing with any of the foregoing, and any other type of coherent optical modulation and detection technique. It is understood that for electronic channel discrimination, a tunable Rx is required. In QAM and PSK it is achieved using a linear receiver, i.e., a receiver where frequency mixing is taking place between a Local Oscillator (LO) and the incoming signal. The LO needs to be tuned at the right frequency such that the mixing product can be at baseband where all the necessary filtering will occur. If a receiver is not operating like above, it requires an optical filter prior to the optical detector.

The modems 20 can be optimized based on 1) the underlying modem's 20 abilities to adjust and 2) the service's need being carried by the wavelength. The modems 20 can support various different baud rates through software-programmable modulation formats. The modems 20 can support programmable modulation or constellations with both varying phase and/or amplitude. In an embodiment, the modems 20 can support multiple coherent modulation formats such as, for example, i) dual-channel, Dual Polarization (DP) Binary Phase-Shift Keying (BPSK) for 100G at submarine distances, ii) DP Quadrature Phase-Shift Keying (QPSK) for 100G at ultra-long-haul distances, iii) 16-QAM for 200G at metro to regional (600 km) distances), or iv) dual-channel 16QAM for 400G at metro to regional distances. Thus, in an embodiment, the same modem 20 can support 100G to 400G. With associated digital signal processing (DSP) in the modem 20 hardware, moving from one modulation format to another is completely software-programmable.

In another embodiment, the modem 20 can support N-QAM modulation formats with and without dual-channel and dual-polarization where N can even be a real number and not necessarily an integer. Here, the modem 20 can support non-standard speeds since N can be a real number as opposed to an integer, i.e., not just 100G, 200G, or 400G, but variable speeds, such as 130G, 270G, 560G, etc. These rates could be integer multiples of 10 Gb/s, of 1 Gb/s, or some other value. Furthermore, with the DSP and software programming, the capacity of the flexible optical modem 20 can be adjusted upwards or downwards in a hitless manner so as not to affect the guaranteed rate. Additionally, the modems 20 can tune and arbitrarily select spectrum; thus no optical filters are required. Additionally, the modem 20 can support various aspects of nonlinear effect mitigation and dispersion compensation (both for chromatic and polarization mode) in the electrical domain, thus eliminating external dispersion compensation devices, filters, etc. Modems can also adapt the Forward Error Correction (FEC) coding that is used, as another method to trade-off service rate vs. noise tolerance.

Modem Operating Modes

The optical modem 20 can include a controller 150 configured to control various operational aspects. The controller 150 can be communicatively coupled to various components in the optical modem 20 for obtaining data and for providing configuration data. The controller 150 is shown in FIGS. 3A and 3B as internal to the optical modem 20, but those skilled in the art will recognize the controller 150 could be external. As described herein, the controller 150 contains feedback circuits, can participate in a control loop or feedback loop, etc. As described herein, an operating mode is some selection of settings or parameters for the various components in the optical modem 20 for operation and the selection is made given certain tradeoffs, e.g., faster SOP tracking at the expense of optical margin. The present disclosure dynamically provisions the operating mode of the optical modem 20 based on statistics of the disturbance of an operating condition. Again, the present disclosure is illustrated with respect to SOP transients as the disturbances. However those skilled in the art will appreciate other types of disturbances are also contemplated such as laser frequency error, clock error, etc. Advantageously, the present disclosure avoids the set-and-forget approach and adds intelligence in terms of operating settings which provide improved performance and ability to avoid errors due to disturbances. This intelligence can also make decisions which may seem counter-intuitive in the set-and-forget approach such as operate with much less margin to get faster SOP tracking, but only temporarily while a disturbance is detected or expected based on statistical properties.

Again, the optical modem 20 must adapt to changes in the operating conditions in order to maintain signal quality. This is especially important as the signal bandwidth and data rates continue to increase. Some changes in the operating conditions are due to the internal components necessary for the operation of the optical modem 20, such as the lasers 110, 132 and clocks 140. Again, the lasers 110, 132 can experience disturbances in terms of their frequency and/or intensity. Changes in the operating conditions may also originate external to the optical modem 20 such as polarization rotation introduced by the channel or interference from other traffic carrying channels.

The controller 150 (e.g., feedback circuits) respond to deviations from a target operating point and, in many cases, there is a tradeoff between the maximum rate of change of a disturbance that can be tracked, and the quiescent noise introduced by the tracking circuit or algorithm. An example of this is a WaveLogic 3 (WL3) modem available from Ciena Corporation which detects and compensates for changes in the polarization state of received symbols by using a feedback loop with a programmable bandwidth. This is an SOP tracking technique which can operate in a plurality of different modes each with associated operating setting, and each having different tracking rates at the expense of optical margin. In a first mode, the optical modem 20 can track polarization transients with rotation rates below a certain value, in a second mode, the tracking is extended to include rates below a second value which is faster than the first value with a modest Optical Signal-to-Noise Ratio (OSNR) penalty with respect to the first mode, and in a third mode, the tracking can be extended to enable tracking of transients with rotation rates at or below a third value, which is faster than both the first and second values, with a larger OSNR penalty with respect to the first mode and the second mode. While this example describes discrete operating modes, in general, a finer granularity optimization between tracking rate and the penalty can be implemented. That is, modes have operating settings and these operating settings can be discretely set or continuously adjusted.

In an embodiment for polarization tracking, a first mode operates with a nominal tracking capability and relatively low quiescent noise. The second and third modes may be the same as the first mode but with increased loop bandwidths. Increasing the bandwidth of polarization tracking feedback loop allows for tracking of fast polarization transients but also increases the bandwidth over which noise can enter the feedback loop. Noise which enters the feedback loop contributes to the quiescent noise of the feedback circuit and is present at all times while the circuit is operating regardless of whether or not a transient is present. Transitioning between tracking modes may also include changing the operation of the loop beyond simply changing loop bandwidths. Examples include modes where changes in polarization state are detected from the decoded transmit symbols vs modes where only the synchronization symbols are considered.

It is important to understand and optimize the tradeoff between the quiescent noise introduced by the various feedback loops and the penalties that occur during transient events. Margin is allocated via modem provisioning such that the penalties during anticipated transients are within the error correction capability of the optical modem 20. The margin which is allocated for the quiescent noise of the feedback loops, as well as the additional noise that is anticipated during transients, decreases the noise margin which is available for the optical modem 20 reducing the optical modem's 20 maximum reach at a given data rate. Utilizing SOP transients as an example disturbance, for a given link, however, it is desirable to increase the polarization tracking rate when sufficient margin exists and when there is a reason to do so.

In an embodiment, the optical modem 20 includes a transmitter and a receiver each configured to communicate over an optical link; and a controller configured to cause operation in a first operating mode; and, responsive to detection of a disturbance in an operating condition associated with the optical modem, cause operation in a second operating mode for a time period based on statistical properties of the disturbance.

Dynamic Provisioning of SOP Tracking Based on Operating Conditions

Using the optical modem 20 and the three SOP tracking modes described above, the optical modem 20 is manually provisioned into one of these modes at install, i.e., set-and-forget conventionally. Of course, it is possible to adjust the modes manually when polarization tracking issues are observed. As described above, the second mode and the third mode improve polarization tracking, but at the expense of margin. For generalization, the first mode can be referred to as a slow-tracking mode, and the third mode can be referred to as a fast-tracking mode.

In an embodiment, the optical modem 20 can dynamically adjust the tracking/penalty in normal operation, such as, for example, the optical modem 20 is always operating at the maximum tracking it can operate at based on the measured/available margin. Thus, in normal operation, the likelihood of having polarization related traffic hits is reduced. Conventionally, the assumption is the arrival time of SOP transient events is uniformly distributed. Accordingly, the optical modems 20 are provisioned with a fixed tracking capability/noise tradeoff when deployed on a link.

However, it has been determined based on measurements that there are cases where SOP transient events are not uniformly distributed. Accordingly, where the distribution of transient events is not uniform, the knowledge (or estimate) of the arrival time distribution can be used to dynamically provision the optical modem 20 in response to the detection of a transient, improving the tradeoff between tracking rate and quiescent penalty.

In Douglas Charlton et al., "Field measurements of SOP transients in OPGW, with time and location correlation to lightning strikes," SOP transients in links that transverse optical Ground Wire (OGPW) were investigated. This work showed that the SOP transients are likely caused by lightning strikes within the vicinity of the link. These transients are of continued interest because they occur with rotation rates that are much faster than had previously been thought possible within a link and, in some cases, can exceed the polarization tracking capabilities of a specific operating mode.

Figure 4:
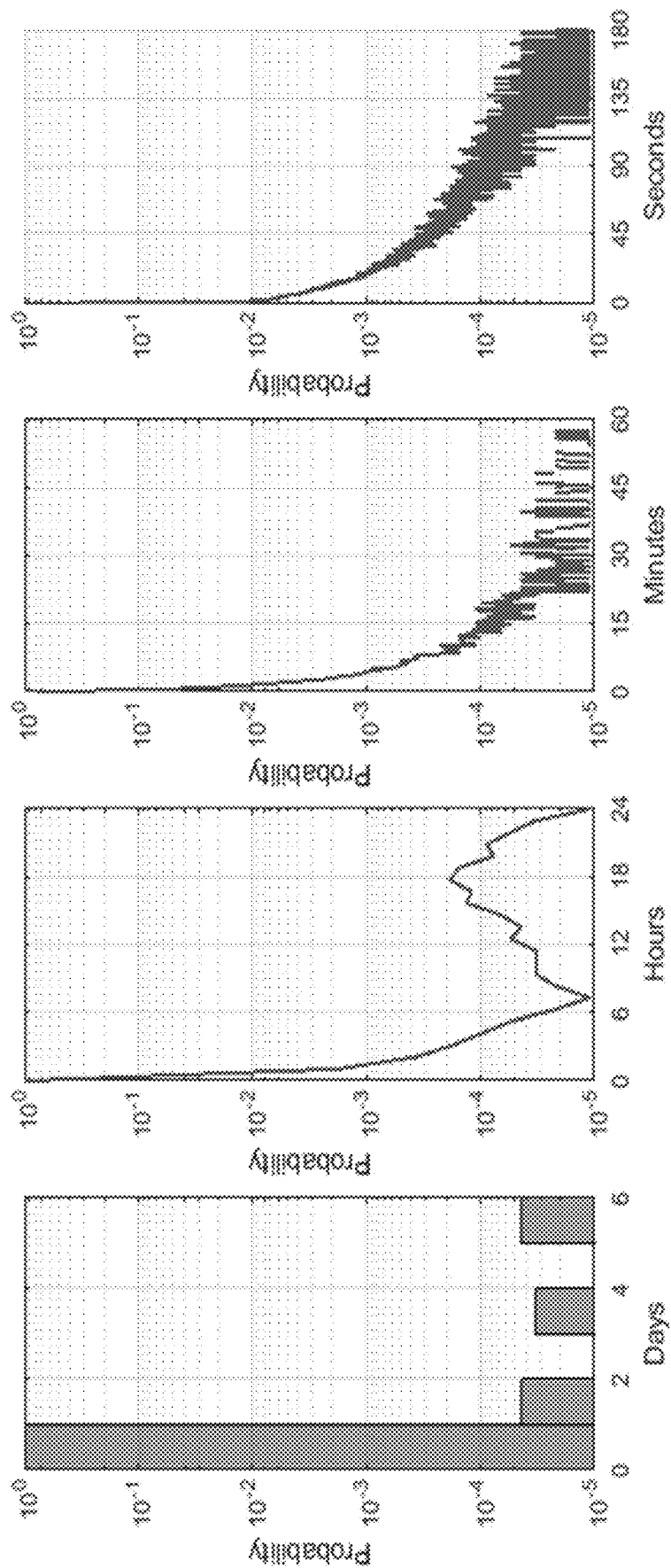
FIG. 4 is graphs of the distribution of the time between polarization transients from field measurements with increased magnification along the time axis.

FIG. 4 is graphs of the distribution of the difference in arrival times between polarization transients from field measurements with increased magnification along the time axis. There exists a strong correlation between lightning strikes and polarization transients in Optical Ground Wire (OPGW) links and the distribution of frequency of transients can be inferred from that of lightning strikes. Based on these field measurements, it was observed that the majority of SOP transients, which are taken to have been caused by lightning, were trackable by the optical modem 20 and there was a small but finite probability of any given SOP transient causing the optical modem 20 to lose acquisition. This data contains 3086 transient events detected with a polarimeter over 53 days during high lightning season. In this example, a transient event is defined as having a deflection of at least 0.18 rad in 6 µs.

Figure 5:
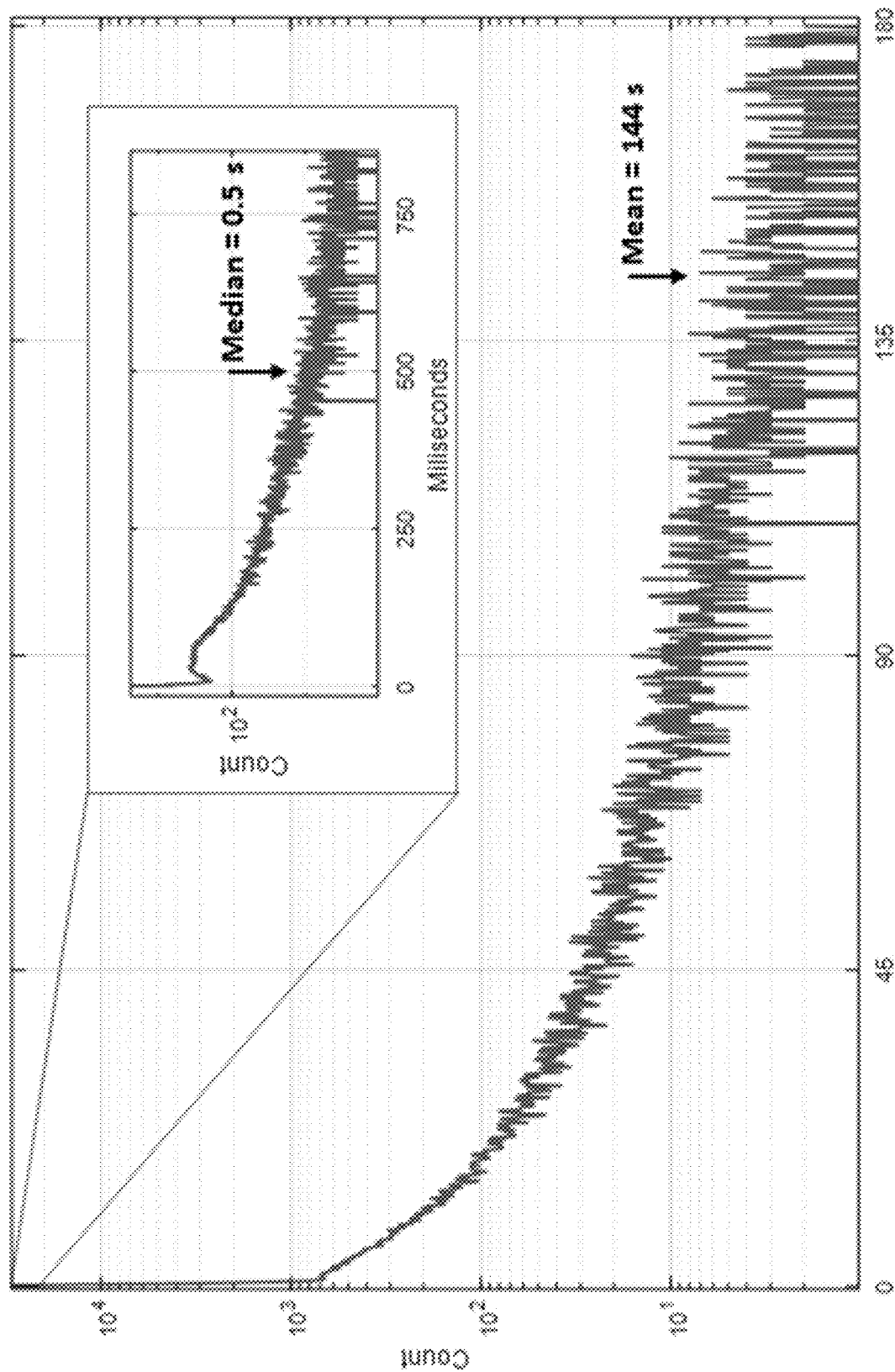
FIG. 5 is a graph of the distribution of time between polarization transients events from the field measurements.

FIG. 5 is a graph of the distribution of time between polarization transients from the field measurements. FIG. 5 includes the same data as FIG. 4 presented on a different time axis. For the link tested, the mean time between lightning strikes was 144 s while the median time was 0.5 s (calculated from 90774 strikes within 5 km of the link), which is to say that lightning strikes tend to arrive in bunches and the distribution of the time between strikes is long-tailed. As described herein, a bunch is a collection of transient events which closely coincide in time.

Note, the field measurements in FIGS. 4 and 5 illustrate examples of arrival time statistics for SOP transients. That is, using historical measurements, it is possible to derive a Probability Distribution Function (PDF) for a property such as the arrival time of SOP transients. In operation, continuous measurements can be taken, and the statistics can be updated over time. Further, the systems and methods can use a Network Management System (NMS), Element Management System (EMS), Software Defined Networking (SDN) controller, or the like to consolidate ongoing measurements and refine statistics. This data can then be provided to the optical modems 20 for use in the dynamic provisioning.

Due to the tightly clustered arrival time of SOP transients, if an SOP transient event is observed then it is likely to be followed by others in short order. The optimum tradeoff between tracking rate and quiescent SNR penalty within a bunch is different than it is in-between bunches. With approximate knowledge of the arrival time PDF, the optical modem 20 can be dynamically provisioned for higher tracking capability such as in the second or third operating mode once a transient is observed. The optical modem 20 can return to an operating mode with lower noise and reduced tracking capability, once transients have not been observed for a holdoff time that is comparable to the expected separation between events. As confidence in the arrival time PDF improves, the optimum settings for the slow-tracking and fast-tracking modes, as well as the choice of holdoff time, improves and with it the available margin on the link. This provides an application space for machine learning within the optical modem 20 such as in the controller 150, or at the orchestration level such as in an NMS, EMS, SDN controller, etc., to develop provisioning as knowledge of link develops.

Figure 6:
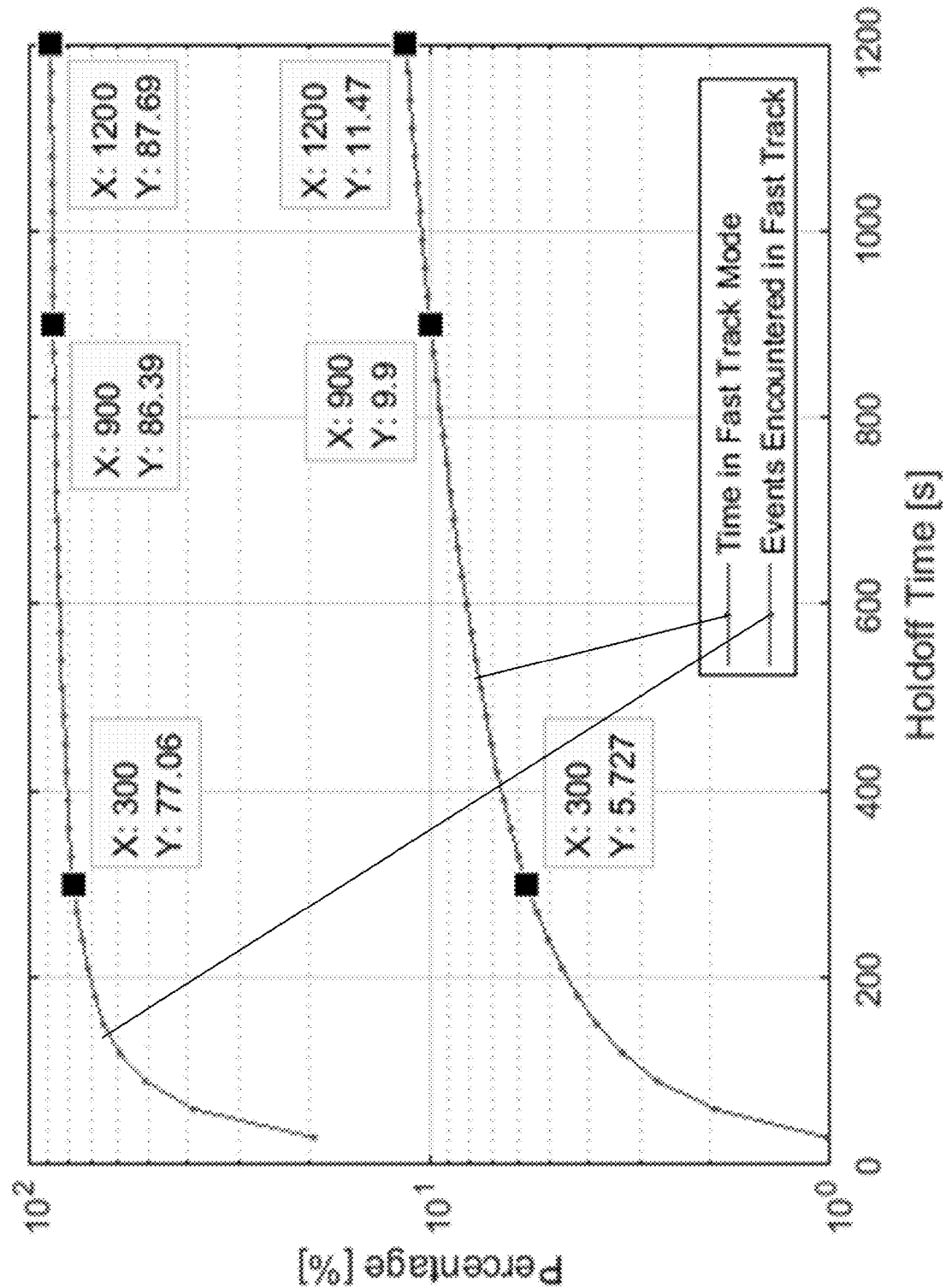
FIG. 6 is a graph of holdoff time percentage of time spent in a fast-tracking mode and percentage of SOP transients encountered while in the fast-tracking mode versus holdoff time.

FIG. 6 is a graph of percentage of time spent in a fast-tracking mode and percentage of SOP transients encountered while in the fast-tracking mode both shown as a function of holdoff time. For a 300 second holdoff time, the optical modem 20 has a 77% chance of being in the fast-tracking mode during an SOP transient while only being in fast-tracking mode 6% of the overall time. Likewise, with a hold off of 900 seconds, 86% of SOP transients were encountered in the fast-tracking mode while in that mode for 10% of the overall time.

Considering that these measurements were taken during a period of high lightning frequency, and so over the lifetime of usage, the percentage of time spent in fast-tracking mode will be lower. The approach here expects to consider data measured over time by various different devices on different links and in different geographic locations to develop statistics and associated holdoff times based thereon.

Given this preceding, it is likely both that a given transient will be trackable and that it will be soon be followed by other transients. It is then useful for the optical modem 20 to detect the first transient in a set and then to transition to a faster-tracking mode. This is a prudent decision because while an individual SOP transient is likely to be tracked, if a large number of SOP transients occur in a set, then it is probable that at least one will be untracked. Hence, when transients are detected, the parameters can be adjusted to reduce the margin to a level that would not be used in normal operation, but that will minimize the probability of traffic hits when the expectation of fast polarization events is higher.

Figure 7:
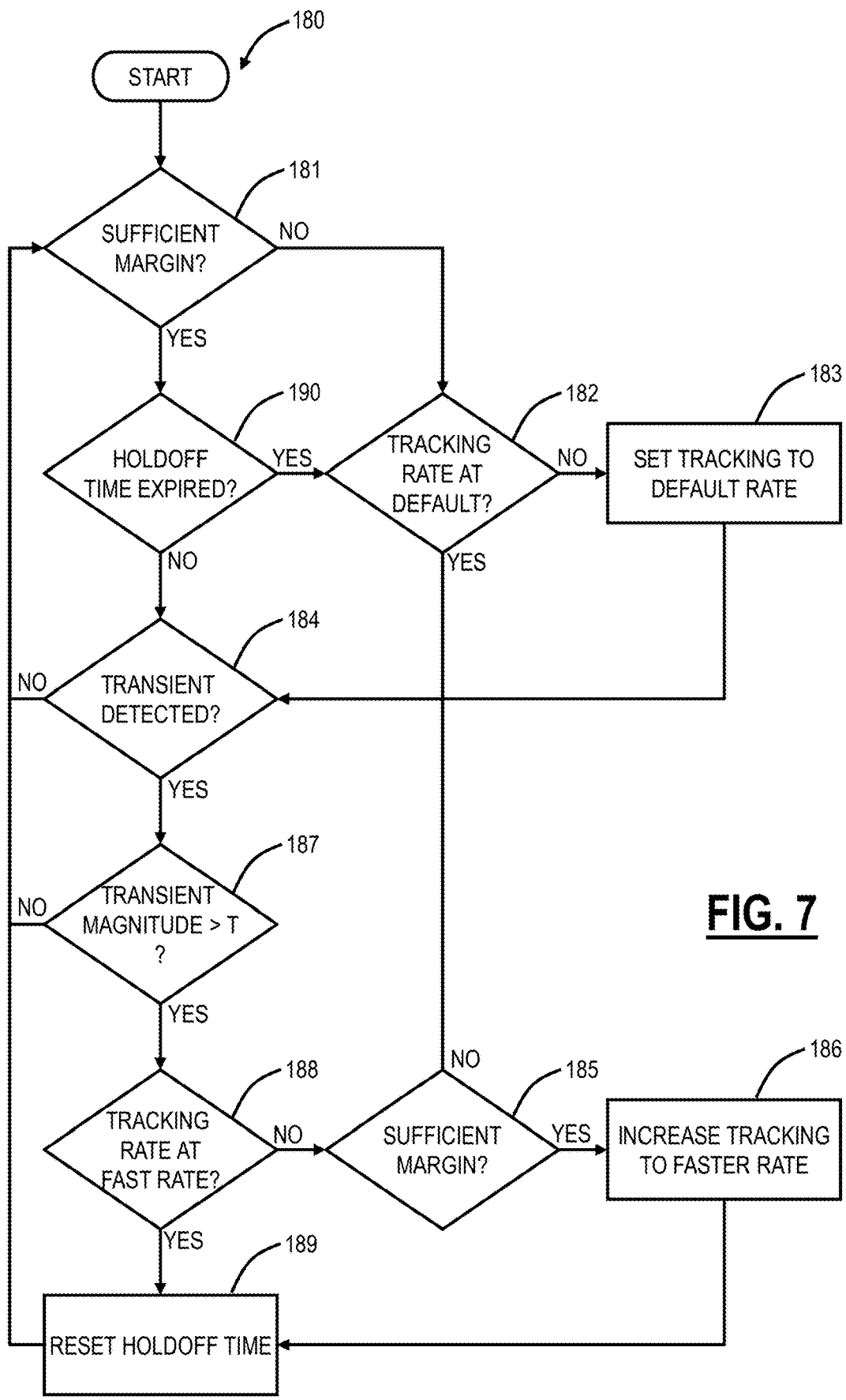
FIG. 7 is a flowchart of a variable SOP tracking process for dynamically provisioning operating modes of an optical modem.

FIG. 7 is a flowchart of a variable SOP tracking process 180 for dynamically provisioning operating modes of an optical modem 20. The variable SOP tracking process 180 is a feedback loop provisioned to respond to perturbations within the loop tracking bandwidth. Increasing the loop bandwidth allows for tracking of faster events but comes at the cost of higher quiescent noise. By including partial knowledge of the anticipated arrival time statistics of transient events, the variable SOP tracking process 180 may dynamically adapt the provisioning of the operating mode in response to observed changes in the link in consideration.

The arrival time statistics may be initialized with values that are typical for an optical modem 20 given its operating environment. Machine learning techniques may be employed to improve the estimate of the arrival time distributions by including measurements made by the optical modem 20 along with other data sources which may include measurements by other optical modems 20, terminal and or line equipment as well as external sources such as historical and forecast weather data, manufacturing data, transportation data, and the like.

The examples given herein describe transitioning of the optical modem 20 between polarization tracking modes in response to the detection of polarization transient events. A key aspect is recognizing that partial knowledge of the statistical properties of events which degrade the performance of a network element can be used to condition dynamic provisioning of that equipment. The feedback loop in the example is compensating for polarization changes but could similarly adapt to clock, laser, or other transients. Dynamic provisioning can be between discrete states such as polarization tracking modes or could involve a continuous variation of loop gains or other control parameters or settings.

The variable SOP tracking process 180 describes a polarization tracking algorithm which takes advantage of the anticipated arrival time statistics such as described herein. The anticipated arrival time statistics are used to select an optimal holdoff time to remain in fast-tracking mode following the detection of a transient event.

The algorithmic steps are summarized as follows: The variable SOP tracking process 180 starts. If there is not sufficient margin (step 181) and if SOP tracking is not set to a default rate (such as a slow-tracking rate which has minimal margin impact) (step 182), the variable SOP tracking process 180 includes setting polarization tracking in the optical modem 20 to the default rate (step 183), i.e., there is no excess margin, thus operate polarization tracking in a manner that does not consume excess margin. The optical modem 20 can operate in this default mode until a polarization transient is detected (step 184). If the tracking rate is at the default rate and there is sufficient margin (step 185), the variable SOP tracking process 180 can include increasing the polarization tracking to a faster rate (step 186), i.e., consuming excess margin which already exists for the purpose of improving polarization tracking.

The decision to switch to a faster tracking mode is based on measurements made within the optical modem 20 of parameters that correlate with polarization activity such as the magnitude of the error signal or variation in tap coefficients in a polarization tracking circuit, variations in pre-Forward Error Correction (FEC) Bit Error Rate (BER), changes in the noise detected on received symbols, and the like. The decision can also consider external data sources such as polarimeter measurements, weather data or observations from other modems.

If a transient is detected (step 184) and the magnitude is greater than a threshold Y (step 187), the variable SOP tracking process 180 evaluates whether to adjust the polarization tracking rate. If the tracking rate is already at a fast (or fastest) tracking rate (step 188), the holdoff time is reset (step 189) since a transient of a sufficient magnitude was detected and the variable SOP tracking process 180 returns to step 181.

If the tacking rate is not at the fast (or fastest) tracking rate (step 188), the variable SOP tracking process 180 determines if there is sufficient margin (step 185), and if so, the variable SOP tracking process 180 can include increasing the polarization tracking to a faster rate (step 186).

Note, the sufficient margin may be set lower than the standard operating margin when transient events are anticipated. The intent is to minimize the total error probability which depends on contributions from quiescent noise processes as well as errors caused by transient events.

If there is not sufficient margin (step 185), meaning it is not advisable to increase the polarization tracking as this could lead to more errors, the variable SOP tracking process 180 can include returning to step 184.

After not detecting a transient (step 184), not experiencing a transient of a magnitude greater than T (step 187), and resetting the holdoff time (step 189), if there is sufficient margin (step 181), the variable SOP tracking process 180 waits for the holdoff time to expire (step 190) prior to changing the tracking rate again. Thus, the variable SOP tracking process 16 checks for sufficient margin before switching and before holdoff has expired to prevent degradation of OSNR margin past the FEC limit in order to preserve the channel. In this case the channel may experience intermittent failure due to SOP transients, but this is preferable to total failure.

Statistics regarding rates of detection of SOP transients may be used to inform decisions at higher levels in the network and which faster SOP tracking modes should be latched. Also, the holdoff time may be based on the statistics associated with field measurements.

Purpose of Changing Operating Modes/Settings

Again, one approach may be to simply set-and-forget various operating modes to consume all available margin, e.g., always operate in the faster polarization tracking mode when the margin is available. The problem here is this leaves no additional margin for addressing different disturbances. Of course, spending less time in the faster polarization tracking mode frees up margin to handle a combination of other disturbances (laser transients, Polarization Dependent Loss (PDL) realization, etc.) as well as to support capacity mining (e.g., increasing baud rate, modulation format, etc. to mine excess capacity).

A value of the present disclosure is in handling multiple disturbance sources such as ones that are fairly rare, generally not correlated, and likely to occur at different times. For example, there may be a polarization burst at one time. There may be a laser frequency jump at another time. There may be a power transient inducing nonlinear or OSNR changes at a third time. In this case, it would indeed help to reset individual control loops to their low noise conditions during times when transients are improbable. Thus, the extra margin could be allocated to any one of the disturbances who's probability of occurrence becomes elevated at any particular point in time.

There are many things which can go wrong with a link that manifest as a degradation of margin (e.g., problems in WSS pixels, EDFAs, a pinched patch cord, etc.). For discussion, collectively refer to the sources of these degradations as a "hardware failure." These problems are of a correctable nature allowing some time for servicing, and so the following states become possible.

First, the hardware failure is unrepaired by the time of arrival of the next SOP transient. SOP tracking will be unable to switch to a faster tracking mode which may result in a hit, but hits would have occurred sooner if the additional margin was unavailable.

It is possible that the hardware failure could have eroded OSNR past the point of the FEC limit of the receiver, which would result in an inoperable channel. Given the inoperable state of the link it may be desirable to reduce the tracking capability of some feedback loops below their nominal settings to reduce the quiescent noise of those circuits. In this condition events such as SOP transients (even those experienced in a lower tracking mode) represent an intermittent failure so instead of an inoperable channel, there is an intermittent one—still undesirable, but an improvement.

Thus, the objective here is to exploit available margin as needed for a temporary time period. For example, if the optical modem 20 in use has hitless modulation format switching, then it is possible to leverage the additional margin to operate at a higher cardinality modulation format most of the time, then switch to a lower cardinality modulation format when SOP transients are anticipated in order to free up the margin required to use a faster SOP tracking mode.

In some links, the rate of arrival of SOP transients can be of such a nature that perpetually operating in a fast-tracking mode is the correct option for minimizing network errors. This result is still valid provisioning of the receiver in consideration of the probability distributions as described above.

The foregoing descriptions are illustrated based on SOP transients. Those skilled in the art will recognize the systems and methods contemplate changing the operating mode based on other detected transients and their statistical properties. Further, the operating mode (or conditions) may be changed in other devices besides optical modems such as in optical amplifiers, etc. For example, laser intensity transients may originate in an amplified line system. The origins may be mechanical, such as fiber bends which will perturb incoming signal power or may be due to optical channel add or drop events in the line system, either planned reconfiguration or unplanned breaks. The amplified line system can change its operating mode temporarily based on the detection of the laser intensity transients and associated statistical properties (e.g., a hold off time can be used, etc.). In another example, laser frequency fluctuations may be due to control loop issues, either on the transmit or receive side, since this is a coherent system or may be due to external system issues, like rapid system thermal transients, poorly suppressed back reflection, etc. Similar, the optical modems can adjust their operating mode based on the detection and statistics of the laser frequency fluctuations.

A laser frequency transient may be caused by a mechanical shock experienced by either the transmit or receive lasers such as when an operator seats a neighboring card in a shelf or during other maintenance events where an operator physically interacts with the equipment. A card may experience multiple mechanical shocks over the course of a several hour maintenance or installation window followed by months of relative quiet. Transients caused by the physical presence of an operator interacting with the line equipment are an example of events which will occur in bunches during maintenance operations with lower probability when the operator is not present, i.e., have statistical properties. When a transient, such as a laser frequency transient, caused by mechanical shock is detected the probability of detecting additional transients over the next several hours increases and it may be beneficial for the optical modem 20 to select a provisioning (operating settings) with increased capacity for addressing transients even if that comes at the expense of increased quiescent noise.

Server

Figure 8:
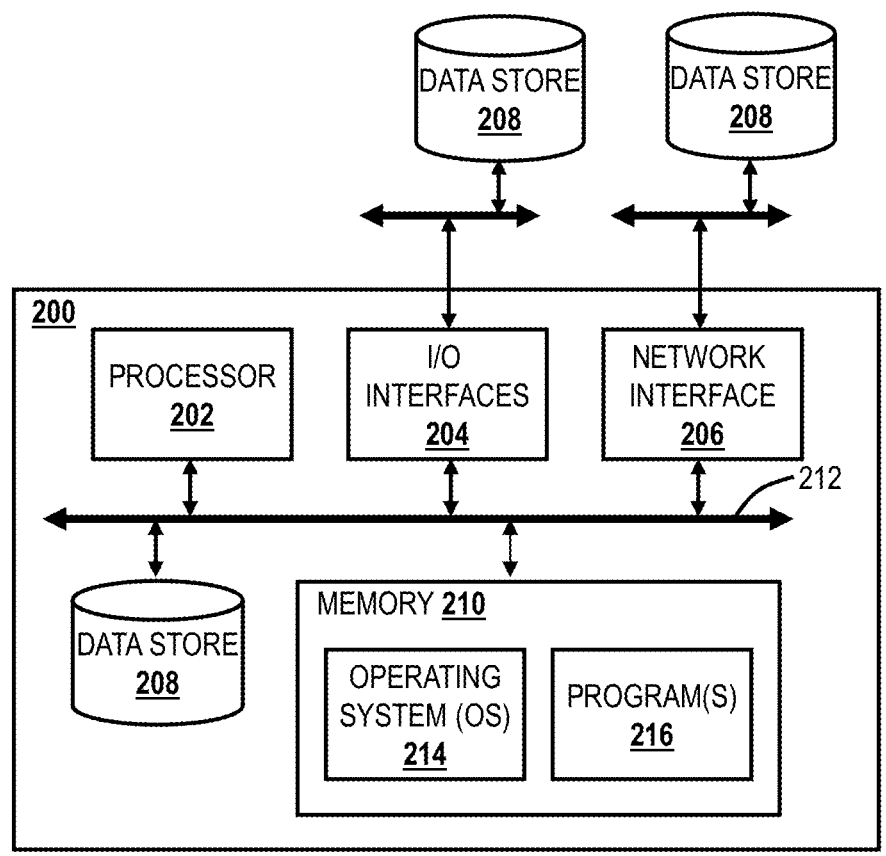
FIG. 8 is a block diagram of a server which may be used to realize a Network Management System (NMS), Element Management System (EMS), Software Defined Networking (SDN) controller, orchestration platform, etc.

FIG. 8 is a block diagram of a server 200 which may be used to realize an NMS, EMS, SDN controller, orchestration platform, etc. In an embodiment, the configuration of the optical modem 20 as well as updating the statistics, operating modes, etc. can be orchestrated via a server communicatively coupled to the optical modems 20.

The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 8 depicts the server 200 in an oversimplified manner, and practical embodiments may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate over a network, such as a wide area network (WAN), a local area network (LAN), and the like, etc. For example, the network elements 12, 14 can communicate to the server 200 via the network interface 206. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

The server 300 can include a network interface communicatively coupled to one or more network elements each comprising one or more optical modems; a processor communicatively coupled to the network interface; and memory storing instructions that, when executed, cause the processor to obtain measurements related to disturbances from the one or more network elements, one or more of determine and update statistical properties of the disturbance, and provide a holdoff time to the one or more network elements for operation of the one or more optical modems in consideration of the disturbance.

In an embodiment, there can be some predictive functionality via the server 300. For example, the server 200 can monitor the weather such as via external data sources and feeds. If one knows some days are prone to lightning, the polarization tracking can be adapted proactively. If a network is planned to undergo some optical reconfiguration or rerouting or addition of channels, control loops that react to optical power changes can be set to faster responses proactively.

In another embodiment, the server 200 can be configured to receive disturbance related data correlated to a certain geography including down to a specific optical link or fibers 16, 18 and develop statistics. These can then be provided to the respective optical modems 20 for optimal operation thereon.

As described herein, the statistical properties of the disturbance can be conditional probabilities which are conditioned on one or more observables that are intrinsic or extrinsic to the network element. These can include available margin, the occurrence of disturbances on this or other network elements, time of year, weather, manufacturing data, history of other network elements of the same type or different type, network topology, network composition and state include the presence and characteristics of interfering channels.

The decision to dynamically provision the optical modem 20 can be based on conditional probabilities where the a priori information can come from external sources, via the server 200. For example, provisioning could be based on the probability of detecting a lightning transient during a hurricane, etc.

Optical Modem Operating Process

Figure 9:
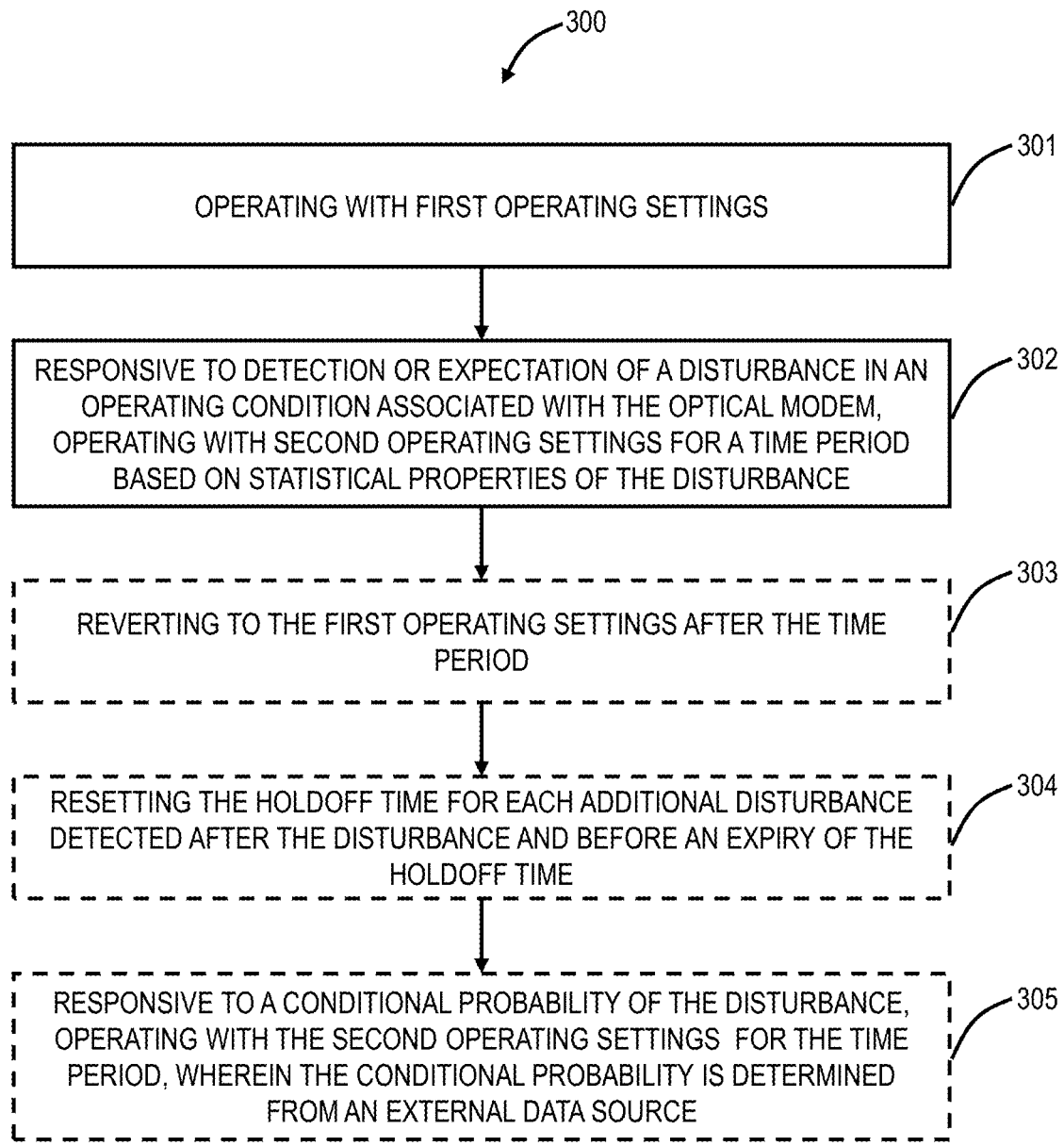
FIG. 9 is a flowchart of a process of operating an optical modem.

FIG. 9 is a flowchart of a process 300 of operating an optical modem 20. The process 300 includes operating with first operating settings (step 301), and, responsive to detection or expectation of a disturbance in an operating condition associated with the optical modem, operating with second operating settings for a time period based on statistical properties of the disturbance (step 302). The process 300 can further include reverting to the first operating settings after the time period (step 303). The time period can be a holdoff time to remain operating with the second operating settings, wherein the holdoff time is set based on the statistical properties, and the process 300 can further include resetting the holdoff time for each additional disturbance detected after the disturbance and before an expiry of the holdoff time (step 304). The process 300 can further include, responsive to a conditional probability of the disturbance, operating with the second operating settings for the time period, wherein the conditional probability is determined from any combination of internal and external data source.

The statistical properties of the disturbance can include one or more of arrival time, periodicity, magnitude, the rate of change, temporal, and correlation, and wherein the statistical properties can be determined through measurements over time. The disturbance can be a polarization transient, and the statistical properties can include arrival time statistics for polarization transients which are used to determine the time period.

The disturbance can be a transient affecting a laser including one or more of an optical frequency transient and an intensity transient. The disturbance can be a transient affecting a clock in a network element with the optical modem. The second operating settings can cause a reduced margin relative to the first operating settings for the time period. The statistical properties can be determined by a server which performs steps of obtaining field measurements and utilizing machine learning to determine the statistical properties based on the obtained field measurements.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical modem comprising:
a transmitter and a receiver, wherein the optical modem utilizes coherent modulation/demodulation techniques; and
a controller configured to
obtain measurements related to operation over an optical link with the optical modem is a first operating mode, wherein the measurements include polarization related measurements,
determine statistical properties of a disturbance on the optical link based on the measurements, wherein the statistical properties relate to any property of the disturbance on the optical link, and
set a second operating mode of the optical modem based on the determined statistical properties.

2. The optical modem of claim 1, wherein each of the first operating mode and the second operating mode refer to associated settings in the optical modem, and wherein there is a trade-off between the first operating mode and the second operating mode and associated margin on the optical link.

3. The optical modem of claim 1, wherein the second operating mode has less margin on the optical link than the first operating mode, but is utilized to compensate for the disturbance that is temporary.

4. The optical modem of claim 1, wherein the disturbance includes a State of Polarization (SOP) transient, wherein the second operating mode includes faster SOP tracking relative to the first operating mode, and wherein the faster SOP tracking causes less margin on the optical link.

5. The optical modem of claim 1, wherein the disturbance is characterized by the statistical properties including any of the arrival time, periodicity, magnitude, and rate of change, and wherein the statistical properties are determined through measurements of the optical link over time.

6. The optical modem of claim 1, wherein the second operating mode is set based on detection or expectation of the disturbance from the measurements, and wherein the second operating mode is used for a time based on the statistical properties of the disturbance.

7. The optical modem of claim 1, wherein the disturbance includes a transient affecting a laser including one or more of an optical frequency transient and an intensity transient.

8. The optical modem of claim 1, wherein the disturbance includes a transient affecting a clock in a network element with one or more of the transmitter and the receiver.

9. The optical modem of claim 1, wherein the second operating mode includes an increase in capacity by increasing any of baud rate and modulation format.

10. A non-transitory computer-readable storage medium having computer readable code stored thereon for programming a device to perform the steps of:
- obtaining measurements related to operation of an optical modem in a first operating mode over an optical link, wherein the optical modem utilizes coherent modulation/demodulation techniques, and wherein the measurements include polarization related measurements;
- determining statistical properties of a disturbance on the optical link based on the measurements, wherein the statistical properties relate to any property of the disturbance on the optical link; and
- causing a second operating mode of the optical modem based on the determined statistical properties.

11. The non-transitory computer-readable storage medium of claim 10, wherein each of the first operating mode and the second operating mode refer to associated settings in the optical modem, and wherein there is a trade-off between the first operating mode and the second operating mode and associated margin on the optical link.

12. The non-transitory computer-readable storage medium of claim 10, wherein the second operating mode has less margin on the optical link than the first operating mode, but is utilized to compensate for the disturbance that is temporary.

13. The non-transitory computer-readable storage medium of claim 10, wherein the disturbance includes a State of Polarization (SOP) transient, wherein the second operating mode includes faster SOP tracking relative to the first operating mode, and wherein the faster SOP tracking causes less margin on the optical link.

14. The non-transitory computer-readable storage medium of claim 10, wherein the disturbance is characterized by the statistical properties including any of arrival time, periodicity, magnitude, and rate of change, and wherein the statistical properties are determined through measurements of the optical link over time.

15. The non-transitory computer-readable storage medium of claim 10, wherein the second operating mode is set based on detection or expectation of the disturbance from the measurements, and wherein the second operating mode is used for a time based on the statistical properties of the disturbance.

16. The non-transitory computer-readable storage medium of claim 10, wherein the disturbance includes a transient affecting a laser including one or more of an optical frequency transient and an intensity transient.

17. The non-transitory computer-readable storage medium of claim 10, wherein the disturbance includes a transient affecting a clock in a network element with one or more of the transmitter and the receiver.

18. The non-transitory computer-readable storage medium of claim 10, wherein the second operating mode includes an increase in capacity by increasing any of baud rate and modulation format.

19. A method comprising
- obtaining measurements related to operation on an optical modem over the optical link, wherein the optical modem utilizes coherent modulation/demodulation techniques, and wherein the measurements include polarization related measurements;
- determining statistical properties of a disturbance on the optical link based on the measurements, wherein the statistical properties relate to any property of the disturbance on the optical link; and
- causing a second operating mode of the optical modem based on the determined statistical properties.

20. The method of claim 19, wherein each of the first operating mode and the second operating mode refer to associated settings in the optical modem, and wherein there is a trade-off between the first operating mode and the second operating mode and associated margin on the optical link.

* * * * *